United States Patent [19]

Holzhauser et al.

[11] Patent Number: 4,520,977

[45] Date of Patent: Jun. 4, 1985

[54] APPARATUS FOR MOUNTING A DOCUMENT FEEDER ON A COPIER/DUPLICATOR

[75] Inventors: Ronald C. Holzhauser, Holley; James A. McGlen; Gary P. Lawniczak, both of Rochester, all of N.Y.

[73] Assignee: Eastman Kodak Company, Rochester, N.Y.

[21] Appl. No.: 427,237

[22] Filed: Sep. 29, 1982

[51] Int. Cl.³ .............................................. E05D 13/12
[52] U.S. Cl. ........................................ 248/201; 16/85; 16/306; 16/366; 248/292.1; 248/364; 355/14 SH
[58] Field of Search ............... 248/201, 280.1, 292.1, 248/364; 16/289, 306, 366, 85; 220/329, 333; 355/14 SH, 3 SH, 75, 25

[56] References Cited

U.S. PATENT DOCUMENTS

| Re. 27,976 | 4/1974 | Sahley. | |
|---|---|---|---|
| 2,467,923 | 4/1949 | Allen | 220/333 |
| 3,354,499 | 11/1967 | Anderson | 16/289 |
| 3,726,589 | 4/1973 | Difulvio et al. | 355/25 |
| 3,829,083 | 8/1974 | Shiina | 271/4 |
| 4,043,665 | 8/1977 | Caldwell | 355/76 |
| 4,097,145 | 6/1978 | Luperti et al. . | |
| 4,098,429 | 7/1978 | Hodge . | |
| 4,135,805 | 1/1979 | Taylor et al. . | |
| 4,169,674 | 10/1979 | Russel . | |
| 4,186,844 | 2/1980 | Swanson | 220/333 |
| 4,439,036 | 3/1984 | Davis et al. | 355/3 SH |

FOREIGN PATENT DOCUMENTS 3102293  9/1982  Fed. Rep. of Germany .

OTHER PUBLICATIONS

Research Disclosure Bulletin No. 19119, Mar. 1980.
Research Disclosure Bulletin No. 19804, Oct. 1980.

Primary Examiner—J. Franklin Foss
Assistant Examiner—David L. Talbott
Attorney, Agent, or Firm—G. Herman Childress

[57] ABSTRACT

A document feeder is mounted for pivotal movement about a side edge portion of a copier/duplicator between a first position over an exposure station or platen of the copier/duplicator and a second position away from the exposure station so that individual documents sheets, books or the like can be manually placed directly on the exposure station for copying. As the feeder moves from its first position to its second position the feeder first pivots about one axis and then, subsequently, about a second axis offset further from the platen than the first axis. Thus the feeder is stepped away from the edge of the copier exposure station to provide a relatively large area that is available for receiving a book or large document on the exposure station for copying. A counterbalancing arrangement is provided for balancing the weight of the feeder as it moves between its two positions.

11 Claims, 9 Drawing Figures

4,520,977

APPARATUS FOR MOUNTING A DOCUMENT FEEDER ON A COPIER/DUPLICATOR

BACKGROUND OF THE INVENTION

This invention relates to apparatus for mounting a document feeder on a copier/duplicator for movement between a position adjacent an exposure station of the copier/duplicator and a position spaced from the exposure station.

It is known to provide a document feeder for a copier/duplicator and to mount such a feeder for pivotal movement relative to the exposure station of the copier so that the exposure station is accessible for copying of individual document sheets, books, or the like. See, for example, commonly assigned U.S. Pat. No. Re. 27,976 which issued on Apr. 23, 1974 in the name of L. W. Sahley entitled DOCUMENT FEEDER (e.g., column 5, lines 42–51 and column 6, lines 37–44), and commonly assigned U.S. Pat. No. 4,169,674 which issued Oct. 2, 1979 in the name of Matthew J. Russel entitled RECIRCULATING SHEET FEEDER (e.g., column 7, lines 47–52). As viewed from the front of the machine, the Sahley document feeder swings in a counter-clockwise direction away from the exposure station and the Russel feeder swings upwardly from the front of the machine about an axis located along the rear of the machine.

Pivotal mounting of document feeders and counterbalancing apparatus therefor also are disclosed in U.S. Pat. Nos. 4,097,145 issued June 27, 1978 in the names of H. E. Luperti et al., and 4,135,805 issued Jan. 23, 1979 in the names of T. N. Taylor et al. Also, a counterbalance mechanism for a document feeder hinged at the back of the copier is disclosed on pages 109 and 110 of the March 1980 edition of Research Disclosure, Item 19119. Research Disclosure is published by Industrial Opportunities Ltd., Homewell, Havant, Hampshire, P09 1EF, United Kingdom.

When feeders are pivoted at the rear of the copier, as disclosed in U.S. Pat. No. 4,169,674, raising of the feeder makes a large area of the platen available for receiving individual document sheets, books or the like that are to be copied. However, when feeders are pivoted at the side edge of the platen (as viewed from the front of the machine) as disclosed in U.S. Pat. No. Re. 27,976, the pivot axis of the feeder normally is near the platen in order to reduce the force required for lifting the feeder and the associated problem of counterbalancing the weight of the feeder. Such placement of the pivot axis leaves very little room at the side edge of the platen adjacent the platen for correctly and conveniently positioning a book for copying. This problem is magnified when the center of the book between two pages is to be positioned along the edge of the platen near the pivot axis. While the single pivot can be extended outwardly away from the edge of the platen, this increases the force required to lift the feeder and also increases the counterbalancing forces. Document feeders may be heavy (e.g., about 60 pounds). Therefore, it is important that much of the weight of the feeder be balanced so that the feeder can be moved between its various positions in response to a light force applied by the machine operator.

It is known to move a member about two pivot axes. For example, U.S. Pat. No. 4,098,429, issued July 4, 1978 in the name of A. M. Hodge for TRASH CONTAINER LID SYSTEM, discloses a trash container with a lid adapted to cover an open end of the container. The lid is moved about one pivot axis to a "stabilized", partly open position to receive trash or other material through the open end of the container. When the container is in the upright position, the lid cannot move beyond its party open or "stabilized" position due to the presence of stops which limit movement of the lid. A counterweight in the lid tends to hold the lid in the open or "stabilized" position. When the container is to be emptied, the container is inverted and the lid moves about a second pivot axis to a fully opened position to allow the contents of the container to be removed by gravity.

Thus a document feeder mounted for movement about an axis at the side of a platen (as viewed from the front of the machine) should be mounted so that when the feeder is in its open position there is a substantial area along side of the platen adjacent to the feeder to accommodate a portion of a book (or other thick document) that is to be placed on the platen for copying. In addition, the feeder should be counterbalanced in such a way that it can be swung from its lowered position to its elevated position and back to its lowered position with a minimum amount of effort by the machine operator. The mounting and counterbalancing problems discussed above are overcome by the present invention.

SUMMARY OF THE INVENTION

The invention relates to an improvement in apparatus for mounting a document feeder on a copier/duplicator or the like for movement between a first position adjacent an exposure station of the copier/duplicator and a second position spaced from the exposure station. The improvement of the invention includes means pivotally mounting the feeder on the copier for movement about a first axis during initial movement of the feeder away from the exposure station, and for movement about a second axis during subsequent movement of the feeder away from the exposure station. The first and second axes are offset from the exposure station with the second axis being spaced further from the exposure station than the first axis. Stop means are associated with the mounting means for stopping movement of the feeder about the first axis after the feeder has moved through a first lift angle.

BRIEF DESCRIPTION OF THE DRAWINGS

In the detailed description of a preferred embodiment of the invention presented below, reference is made to the accompanying drawings, in which.

DETAILED DESCRIPTION OF A PREFERRED EMBODIMENT

Figure 1:
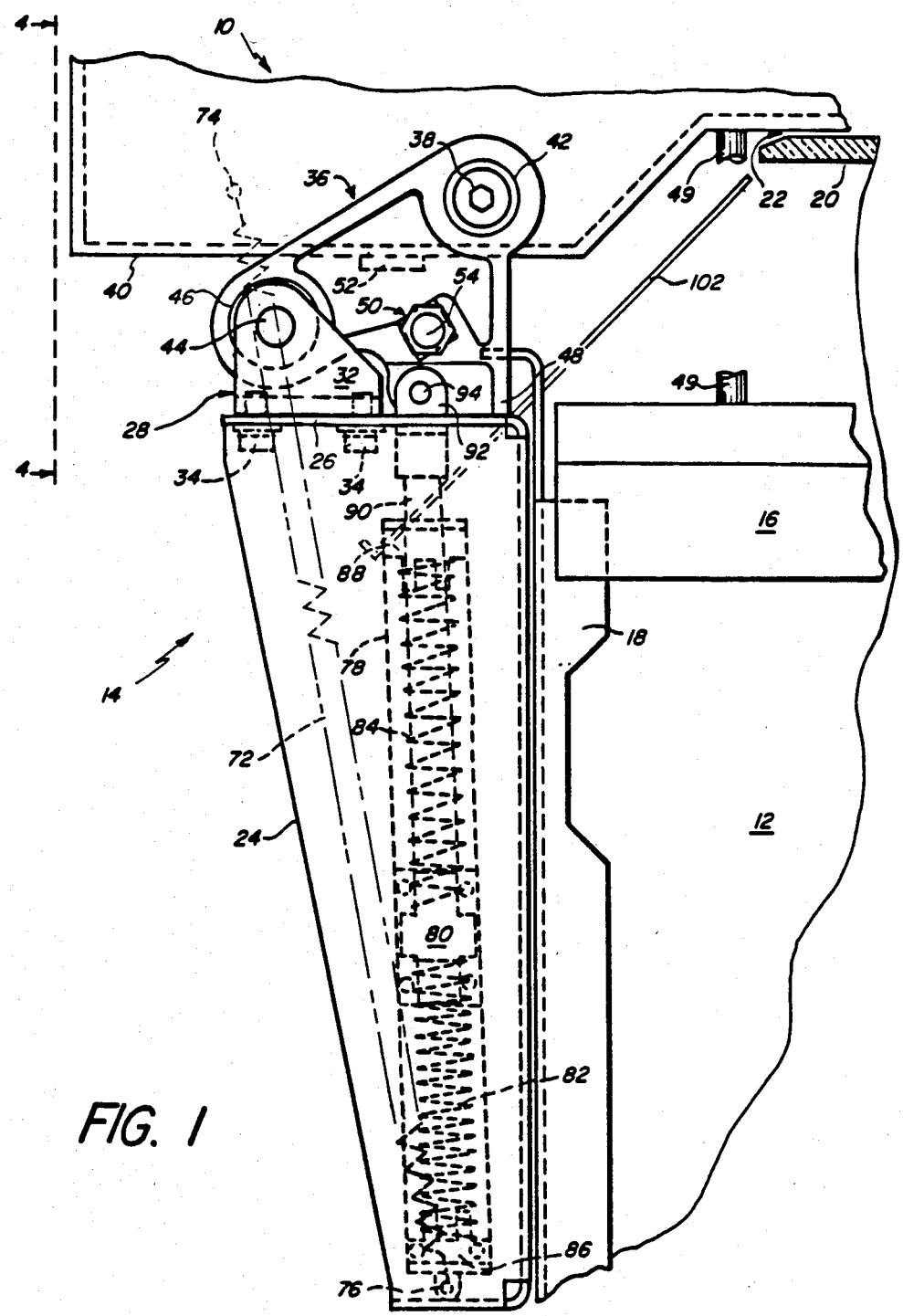
FIG. 1 is a fragmentary front elevation view of apparatus for mounting a document feeder on a copier or the like in accordance with the present invention.

In accordance with the present invention a document feeder 10 is mounted on a copier/duplicator or the like 12 by mounting apparatus generally designated 14. In order to simplify the drawings and the explanation thereof, only fragmentary portions of the feeder 10 and copier 12 are illustrated and described. The feeder 10 can be a recirculating document feeder, as disclosed in one or more of the before-mentioned commonly assigned U.S. patents, or it can be document positioner apparatus designed to feed a single sheet across an exposure station of the copier for copying one or more times. The mounting apparatus 14 also can be used for mounting apparatus other than document feeders, such as covers or doors.

Copier 12 includes frame members 16 and 18 and a platen 20 that is supported by the frame. Platen 20 defines an exposure station of the copier/duplicator. Other exposure stations can be provided as is well known in the art, including slit-scan type arrangements. A document sheet to be copied is fed into the space 22 between the upper surface of the platen 20 and a plate on the lower portion of the feeder 10. Vacuum belts 19 (FIG. 8) or other drive means on feeder 10 move the document sheet relative to the platen 20. For example, sheets can be moved in a right to left direction and or a left to right direction across the platen as viewed in FIGS. 1-3. Document sheets, books, etc. can be placed on the platen for copying after the feeder is raised to its FIG. 3 position.

The portion of the copier/duplicator illustrated comprises the left side edge portion of the copier (as viewed from the front of the copier). Portions of the copier/duplicator illustrated in FIG. 8 include a front 21, a top 23 having an opening for platen 20, a left side 25, and a wall 27 that projects above top 23 at the back of the copier. An operator control panel 29 can be located on wall 27. The front, top and other exterior portions of the copier/duplicator shown in FIG. 8 enclose the frame members 16, 18 and other parts shown in the other figures. Mounting apparatus 14 mounts the feeder for pivotal movement about the left side edge portion of the copier, as described in more detail later.

Figure 2:
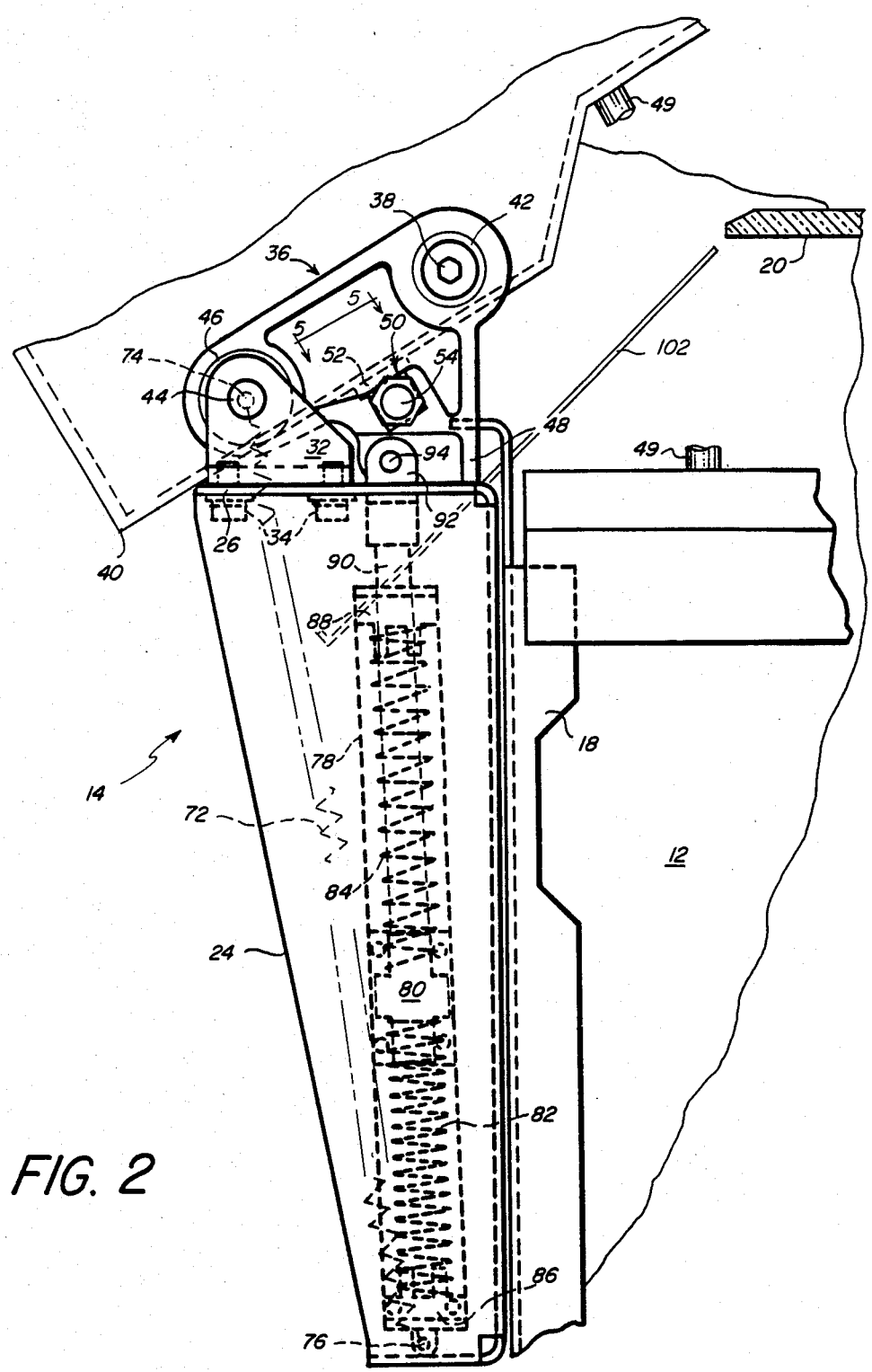
FIG. 2 is a view similar to FIG. 1 but showing the apparatus after the feeder has been pivoted through a first lift angle about one pivot axis.
Figure 3:
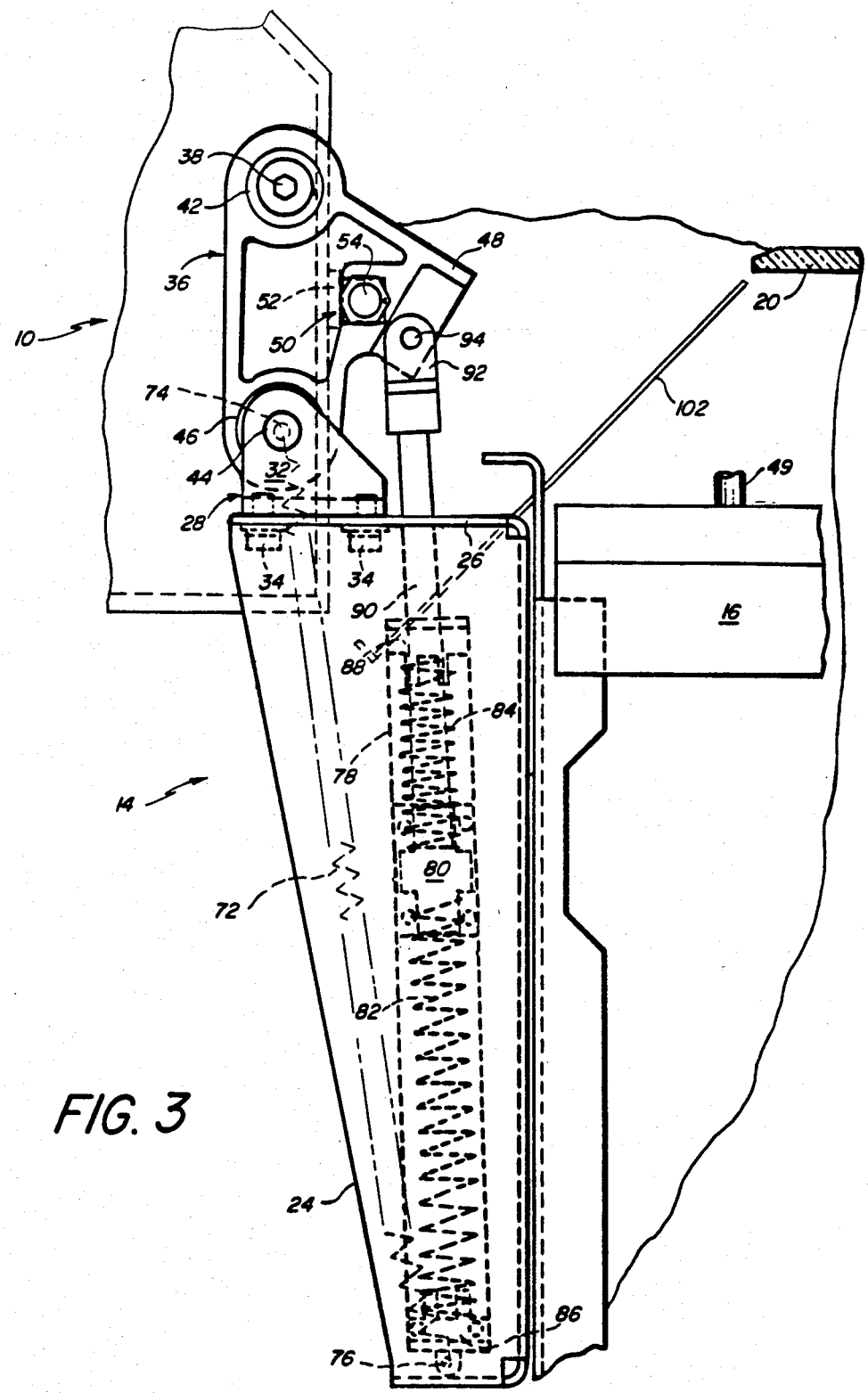
FIG. 3 is a view similar to FIG. 2 but showing the apparatus after the feeder has been pivoted through a second lift angle about a second axis to a fully raised position.

A pair of generally U-shaped frame members 24 are secured to the copier frame 18 and open to the left side of the copier as viewed in FIGS. 1-3. Each of the frame members are closed at the top by a plate 26. Secured to each plate 26 is a generally U-shaped mounting member 28 having a pair of upwardly projecting arms 30 and 32. The mounting members are secured to plates 26 by bolts 34.

Figure 4:
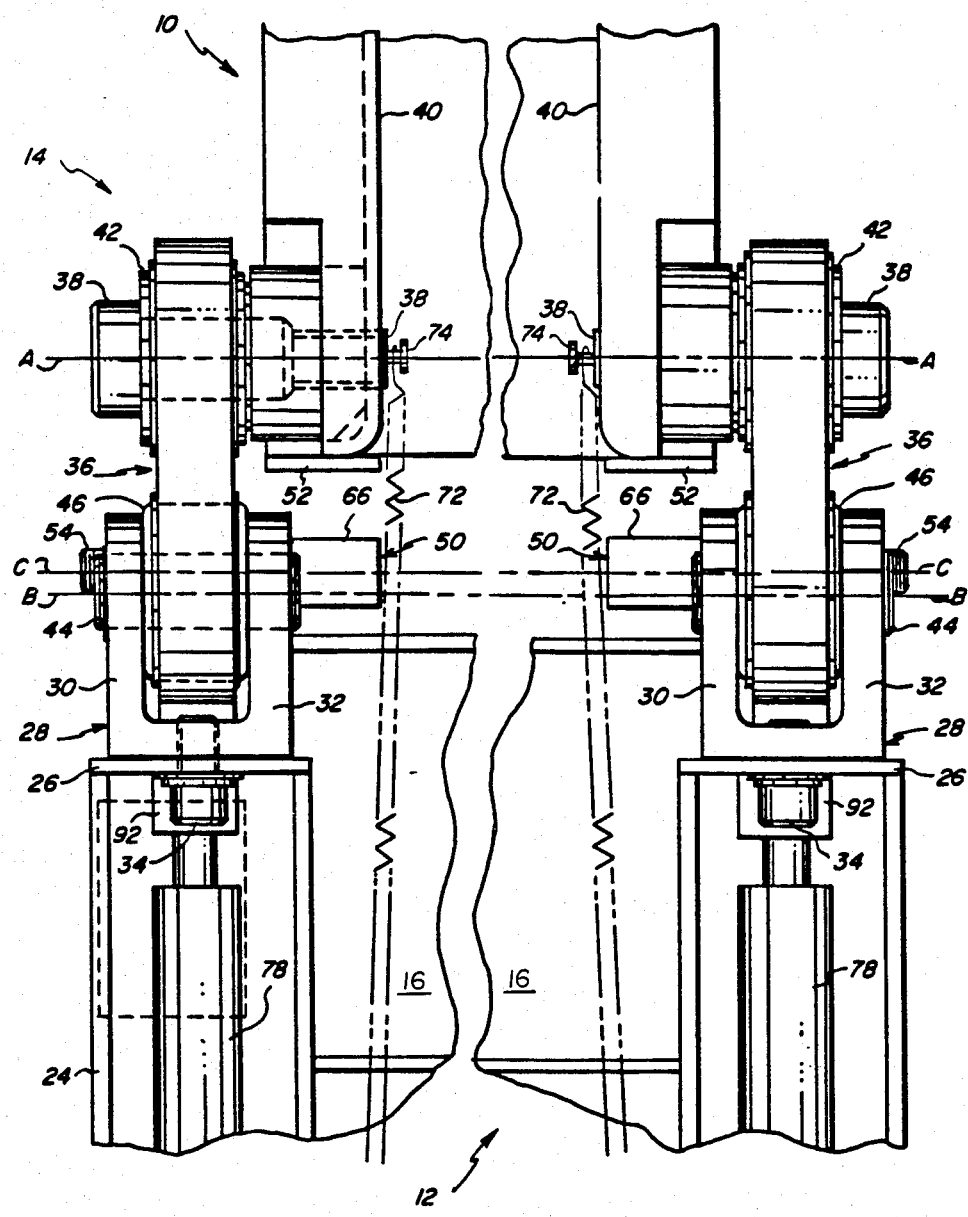
FIG. 4 is a fragmentary end view of the apparatus as viewed generally along line 4—4 in FIG. 1.

The mounting apparatus 14 includes a pair of brackets 36 of generally triangular shape. A pair of pivots 38 extend through openings in one corner portion of each of the brackets 36 and into frame members 40 of the recirculating feeder 10. Thus pivots 38 pivotally mount feeder 10 on brackets 36 for movement about an axis A—A (FIG. 4) extending through the center of the pivots. Axis A—A is in a horizontal plane below a horizontal plane through platen 20. More specifically, bearings 42 can be provided for rotatably securing the pivots 38 in the mounting brackets 36, and the pivots can be threadedly secured to frame members 40 of the feeder.

A second corner portion of each mounting bracket 36 spaced from the pivots 38 is positioned between the arms 30, 32 of the mounting members 28. A pair of pivot pins 44 are supported by the arms 30, 32 and pass through the second corner portion of the mounting brackets 36 for pivotally connecting the brackets onto the copier frame. Preferably, bearings 46 are provided between the pivots 44 and the brackets 36. Thus brackets 36 are mounted for pivotal movement about an axis B—B (FIG. 4) extending through the center of pivots 44. Axis B—B is spaced from and generally parallel to the axis A—A. Axis B—B also is offset further from platen 20 than axis A—A, and it is in a horizontal plane that is lower than similar planes through axis A—A and the platen 20.

Each of the brackets 36 has a foot portion 48 at the third corner portion of the bracket. Foot portions 48 are engageable with the plates 26 of frame members 24 in order to limit pivotal movement of the brackets about axis B—B in a clockwise direction. In a similar manner clockwise movement of the feeder 10 about the A—A is limited by one or more stops 49 that are supported by frame members 16 of the copier and are engageable by the feeder when it reaches its lowermost position over the platen 20, as illustrated in FIG. 1 of the drawings. The location of stops 49 can be varied, as desired. For example, stops 49 can be at the end portion of the feeder 10 opposite from the mounting brackets 36.

Rotation of feeder 10 in a counterclockwise direction about axis A—A is limited by a pair of stops 50 that are secured to the brackets 36 and project inwardly into the path of movement of frame members 40 of the feeder. Pads 52 on the frame members 40 contact the stops 50. It is desireable to be able to adjust the relative position of pads 52 and stops 50. With such adjustment the pads can simultaneously contact both stops and some slight adjustment can be provided in the arcuate position of the feeder relative to the brackets when the pads contact the stops. Such adjustment is accomplished by the preferred construction of the stop members 50 as illustrated in FIGS. 5-7 of the drawings.

Figure 7:
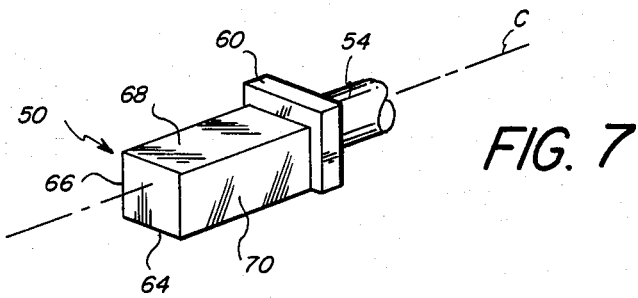
FIG. 7 is a perspective view of the stop.
Figures 5, 6:
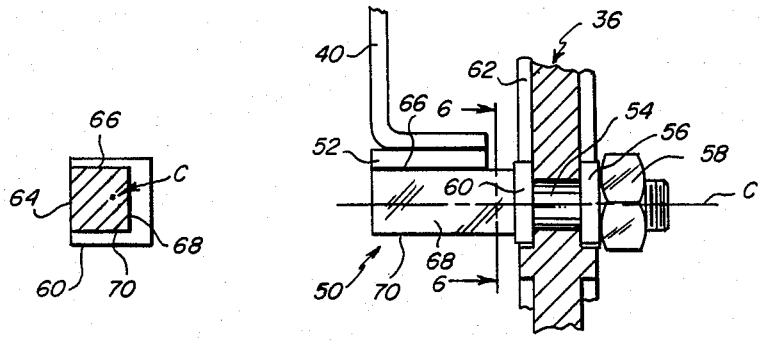
FIG. 5 is a fragmentary detailed cross-sectional view taken along line 5—5 in FIG. 2 illustrating the contact between the feeder structure and a stop to limit movement of the feeder about one axis.
FIG. 6 is a cross-sectional view of the stop taken along line 6—6 in FIG. 5.

Referring now to FIGS. 5-7, stop members 50 each preferably comprises a generally cylindrical end portion 54 that projects through an opening in the central portion of a mounting bracket 36. The outer end of portion 54 is threaded so that the stop can be secured to the bracket by a washer 56 and nut 58. Cylindrical portion 54 has an axis C—C. A square shoulder 60 projects from the stop at the inner end of the cylindrical portion 54. Shoulder 60 is received into a generally square recess 62 of the bracket 36 with the lower edge of the shoulder being adjacent to the lower edge of the recess 62 when the stop is located in any of four positions 90° apart. This prevents inadvertent rotation of the stop relative to a bracket 36 and also helps locate the stop in each of four distinct positions.

The end portion of each stop opposite from cylindrical portion 54 comprises four flat, rectangular surfaces 64, 66, 68 and 70 that are perpendicular to shoulder 60. Any of surfaces 64–70 can be positioned for contact by a pad 52 by loosening the nut 58, moving the stop along its axis C—C to the left (as viewed in FIG. 5) until shoulder 60 is removed from recess 62, then rotating the stop until the desired surface is positioned for contact by a pad 52, and then moving the stop back to the right to return the shoulder 60 into recess 62 and tightening the nut 58. As shown in FIG. 6, surfaces 64–70 are each spaced a different distance from the axis C—C of rotation of the stop. Thus by rotating the stop to present different ones of faces 64–70 thereof for contact by the pads 52, both pads will contact the stops at essentially the same time during movement of the feeder from its FIG. 1 position to its FIG. 2 position. Also, this adjustment can be used to slightly vary the extent of arcuate movement of feeder 10 required to bring pads 52 into contact with the stops 50.

Feeder 10 may be relatively heavy (about 60 pounds for example). Accordingly, it is desireable to provide counterbalancing apparatus to facilitate movement of the feeder between its FIG. 1 and its FIG. 3 positions. It will be appreciated that most of the weight of the feeder (and thus its center of gravity) is located to the right side of brackets 36 when the feeder is in the positions illustrated in FIGS. 1–2. However, as the feeder travels from its FIG. 2 position to its FIG. 3 position the feeder center of gravity moves to the left side of pivots 38 and 44. Thus the counterbalancing apparatus must exert a force on the feeder in a counterclockwise direction when the center of gravity is to the right side of pivots 38, 44 and also apply a force in a clockwise direction after the center of gravity moves to the left side of pivots 38, 44.

The preferred counterbalancing apparatus illustrated in the drawings includes a pair of tension springs 72, each of which has its ends secured to a spring retainer 74 on the feeder 10 and to a similar retainer 76 mounted on the bottom portion of frame members 24. Retainers 74 are located so that they are to the left of pivots 38 and above pivots 44 when the feeder is in its FIG. 1 position. However, the retainers 74 swing into alignment with pivots 44 on axis B—B when the feeder reaches its FIG. 2 position, and the retainers 74 remain on axis B—B as the feeder moves from its FIG. 2 to its FIG. 3 position. With this arrangement, when the feeder is in its FIG. 1 position wherein the center of gravity of the feeder is to the right side of pivots 38, 44, the springs 72 exert a downward force that is applied to the left side of the pivots 38. Thus springs 72 tend to counterbalance the weight of the right end portion of the feeder. The force of springs 72 alone is not sufficient, however, to swing the right end of the feeder counterclockwise from its FIG. 1 position about pivots 38 without some (slight) force being applied by the operator. As the feeder moves between its FIG. 2 and its FIG. 3 position, the springs 72 hold the feeder against clockwise movement about pivots 38 and axis A—A.

The counterbalance apparatus also comprises a pair of cylinders 78. One cylinder 78 is located inside each frame member 24 and has its lower end portion secured to a portion of retainer 76 inside frame member 24. Inside each cylinder 78 there is a piston 80 located between a lower compression spring 82 and an upper compression spring 84. Spring 82 is compressed between the piston 80 and a spring retainer 86 in the bottom of the cylinder 78. Similarly, spring 84 is compressed between the piston 80 and a retainer 88 in the upper portion of the cylinder.

A rod 90 is secured to each piston 80 and projects upwardly though the upper end of cylinder 78. A clevis 92 is mounted on the upper end of each rod 90. Each clevis 92 straddles the lower portion of one of the brackets 36 and is secured thereto by a pin 94. Springs 82, 84 and the related apparatus counterbalance the weight of the feeder as the feeder moves counterclockwise from its FIG. 2 position to its FIG. 3 position. Initially springs 82 apply a force urging the feeder in a counterclockwise direction. After the feeder is raised about 65°–70° degrees from its FIG. 1 position, springs 84 apply a force opposing counterclockwise movement of the feeder as the feeder moves to its FIG. 3 position where the center of gravity of the feeder is to the left side of pivots 38, 44.

Operation of the apparatus of the invention will now be described. Assuming intially that the feeder is in its lowermost position, as illustrated in FIG. 1, the feeder tends to stay in that position because the center of gravity of the feeder is located to the right side of the bracket 36 and the force exerted by the counterbalancing apparatus is not sufficient to overcome the weight of the feeder. In addition, the feeder can be held in its FIG. 1 position by a latch (not shown).

When it is desired to raise the feeder to copy a single document, a book, etc., the operator exerts a counterclockwise force on the feeder 10 by, for example, lifting the portion of the feeder opposite from mounting apparatus 14. Initially the feeder pivots about the axis A—A extending through pivots 38. At this time the weight of the feeder is transmitted through pivots 38 to brackets 36 and the resulting force tends to hold brackets 36 with feet 48 on plates 26 as shown in FIG. 1.

Figure 8:
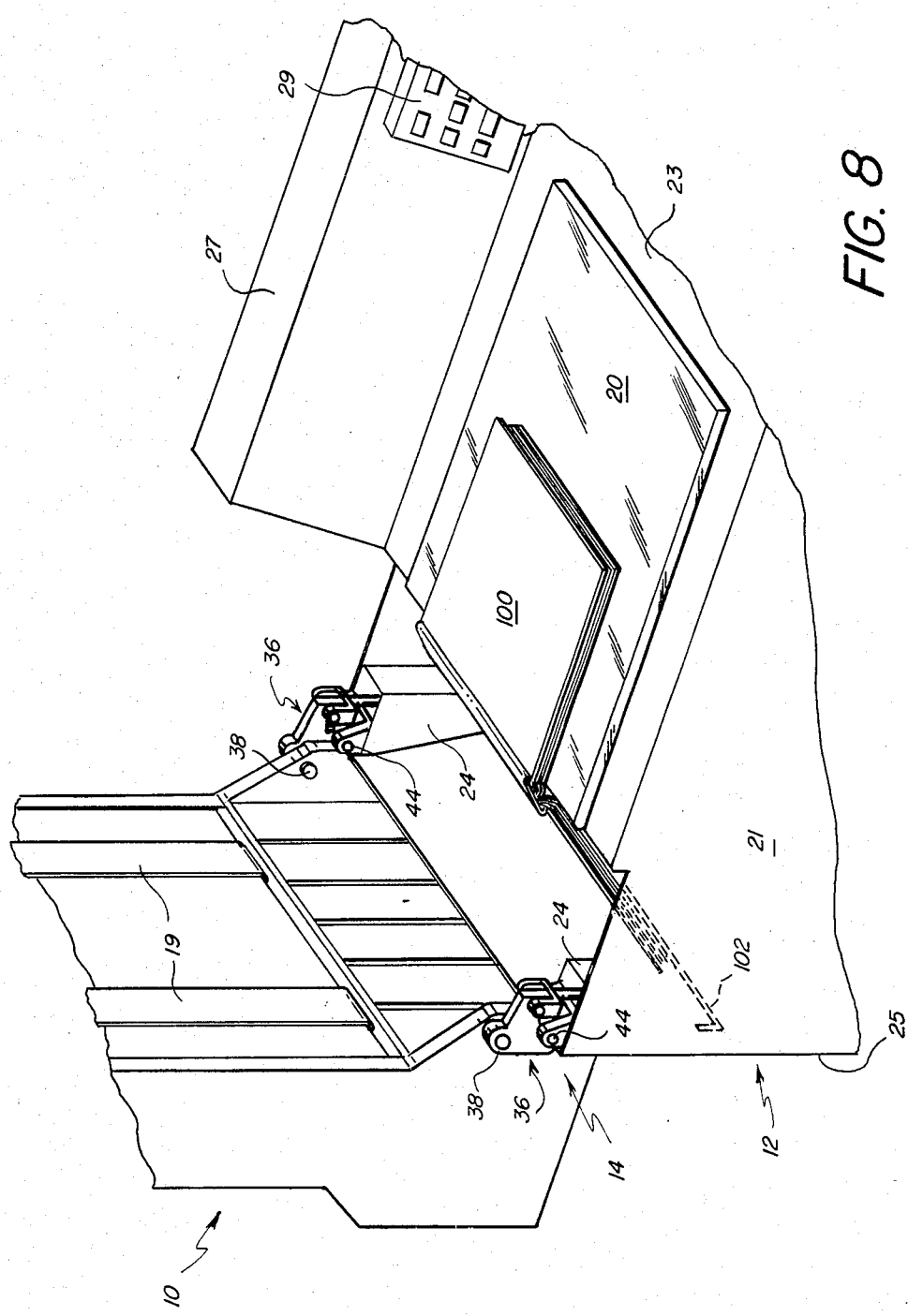
FIG. 8 is a fragmentary perspective showing the feeder in its raised position and showing a book positioned on the platen.

Counterclockwise movement of the feeder brings the pads 52 into engagement with one of the surfaces 64–70 of the stops 50. This is the position illustrated in FIG. 2 of the drawings. In the particular embodiment of the invention illustrated, the feeder pivots approximately 30 degrees about axis A—A before pads 52 strike the stops 50. Pads 52 and stops 50 prevent further pivotal movement in a counterclockwise direction of the feeder about axis A—A. However, continued application of a counterclockwise force to the feeder 10 by the operator effects pivotal movement of the feeder about the axis B—B of the pivots 44. As such additional movement occurs, the brackets 36 also move with the feeder 10 about axis B—B. Ultimately the feeder reaches a generally vertical position relative to platen 20 as illustrated in FIGS. 3 and 8.

During movement of the feeder from its FIG. 1 to its FIG. 2 position, a counterbalancing force is applied by springs 72 tending to urge the feeder in a counterclockwise direction. The force exerted by springs 72 gradually decreases during such movement. As the feeder moves from its FIG. 1 to its FIG. 2 position, springs 82 in cylinders 78 exert a constant upward force against the pistons 80. This force is transmitted through piston rods 90 and clevis' 92 to the brackets 36. However, the weight of the feeder 10 overcomes the force applied by the springs 82 and the brackets thus remain in the position illustrated in FIGS. 1 and 2. After the feeder passes through its FIG. 2 position on the way to its FIG. 3 position, the feeder swings about axis B—B and springs 82 are effective to urge the feeder in a counterclockwise direction.

During the movement between the FIG. 2 and FIG. 3 positions, springs 82 are extended due to upward movement of the pistons 80. Thus springs 82 exert an upwardly directed force to facilitate counterclockwise movement of the feeder, but the force decreases during movement of the feeder away from its FIG. 2 position.

Springs 84 exert little or no force when the feeder is in its FIG. 2 position. However, as the feeder moves away from its FIG. 2 position toward its FIG. 3 position, upward movement of pistons 80 gradually compress springs 84, thereby applying a downwardly exerted force on rods 90. The force exerted by springs 84 gradually increases during upward movement of the feeder about axis B—B, thereby introducing a retarding force that slows upward movement of the feeder as it approaches its FIG. 3 position. This retarding force counterbalances the feeder after its center of gravity moves to the left side of pivots 44.

The energy stored in springs 84 when the feeder is in its FIG. 3 position assists in downward movement of the feeder from its FIG. 3 position. Also, during downward movement of the feeder to its FIG. 2 position, there is a gradual increase in the compression of springs 82, and thus a gradual increase in a retarding force exerted by springs 82 on pistons 80 and on the feeder.

Figure 9:
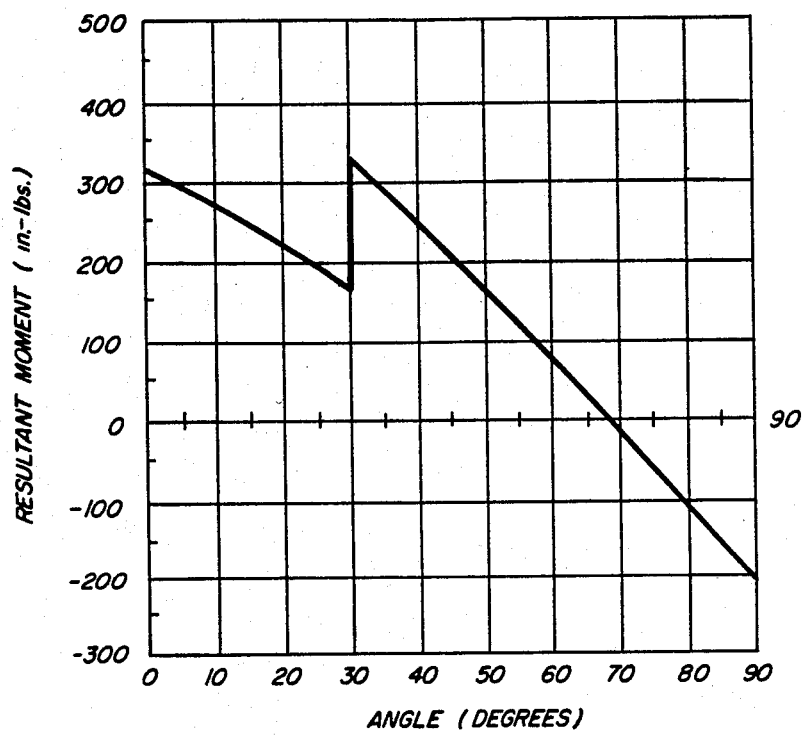
FIG. 9 is a graphic illustration of one example of counterbalancing forces of the apparatus of the invention.

FIG. 9 of the drawings graphically illustrates summation of the several counterbalancing forces during movement of the feeder from its FIG. 1 to its FIG. 3 position in one particular example. In this particular example, the axis A—A of pivots 38 is offset about 3.625 inches (9.2 cm.) from the left edge of the platen 20 and the axis B—B of pivots 44 is located about 6.625 inches (16.8 cm.) from the left edge of the platen. As illustrated in FIG. 9, during movement of the feeder about axis A—A for about 30 degrees (i.e., until pads 52 engage stops 50) the resulting moment of force gradually decreases from about 310 inch pounds to about 170 inch pounds. Such reflects the force exerted by the counterbalancing springs 72. After pads 52 strikes stops 50 and the feeder begins moving about the axis B—B of pivots 44, there is initially a sharp increase in the resultant moment from about 170 inch pounds to about 325 inch pounds. This increase results from the feeder beginning to pivot about axis B—B instead of axis A—A. The increase reflects an increase in the length of the lever arm from the center of gravity of the feeder to the pivot axis B—B. Thereafter, the resultant moment gradually decreases until it reaches a value of zero after about 67 degrees of movement by the feeder. The force applied during the slope represented from about 30 degrees to 67 degrees primarily represents the force applied by the lower springs 82 in cylinders 78. Thereafter the resulting force is a negative force and increases in a negative direction from zero inch pounds at about 67 degrees to about 203 inch pounds at 90 degrees, the FIG. 3 position. The negative force values are produced by the compression of springs 84 by pistons 80 during the latter stages of movement of the feeder from its FIG. 2 position to its FIG. 3 position. This negative force is important because it counterbalances the feeder after the feeder's center of gravity passes to the left side of axis B—B.

The combination of forces produced by the compound counterbalancing apparatus also is effective when the feeder is returned from its FIG. 3 position to its FIG. 1 position. During such movement, the operator will initially need to overcome the difference in the force of gravity, which is urging the feeder in a counterclockwise direction, and the force applied by springs 84, which is urging the feeder in a clockwise direction. As the feeder moves clockwise springs 82 are compressed, and the compression of springs 82 balances the feeder until it reaches its FIG. 2 position. After the feeder passes its FIG. 2 position and begins pivoting about axis A—A again, springs 72 counterbalance the feeder until it reaches its FIG. 1 position.

The apparatus of the present invention results in a number of advantages. First of all, by stepping the feeder laterally to the left side away from the platen in a two-step operation as described hereinbefore, the feeder is moved further away from platen 20 than would occur if the full range of arcuate movement of the feeder was about axis A—A. This two-step operation increases the unobstructed area over and adjacent the platen when the feeder is fully raised, and thereby facilitates placement of books and other thick documents over the platen. This is illustrated in FIGS. 3 and 8 which shows the feeder fully raised. (In FIG. 8, the open area to the left of the platen is somewhat enlarged, relative to the other views, to simplify illustration of other portions of FIG. 8.) It will be observed that there is sufficient area between the feeder and the left edge of the platen to allow a portion of a book 100 (FIG. 8) to be placed in the area to the left of the platen during copying of another portion of the book positioned over the platen. More specifically, the left page of an open book rests on a tapered wall 102 that extends from adjacent the left edge of the platen downwardly to the left. The right page of the book lies flat on the platen and registered with the registration line along the left side edge portion of the platen. This placement of a book is permitted by the mounting apparatus of the invention which creates the open area between the feeder and the copier/duplicator. This open area also facilitates threading and copying of substantially endless webs, such as computer printouts because the web can be threaded through this area.

Also, the force required for an operator to lift the feeder through its first lift angle of about 30 degrees about axis A—A is less than the force that would be required if the feeder moved only about axis B—B. The initial lifting force is less because axis A—A is nearer to the center of gravity of the feeder and further from the retainer 74 where the force is applied to the feeder by springs 72. Also, as is apparent from FIG. 9, the moments of force are much different than a generally sinusoidal force profile which would be produced by counterbalancing apparatus comprising a single spring or combination of springs. The negative force illustrated in FIG. 9 opposes further counterclockwise movement of the feeder after it reaches a predetermined level just before reaching the FIG. 3 position. Thus upward movement of the feeder is slowed before it reaches its fully-open position.

As mentioned earlier, it is preferred that the feeder 10 be mounted on the copier 12 so that the feeder pivots about axes located along the left side edge of the copier. The space available at the left side edge of a copier normally is available for pivoting movement of the feeder through the range of positions illustrated in FIGS. 1–3. In contrast, pivotal mounting of the feeder for movement about an axis along the back edge portion of the copier may be somewhat limited due to the presence of wall 27 or by some other vertical portion of the copier located rearwardly of the feeder.

The counterbalancing apparatus of the invention can be adjusted to achieve various results. For example, use of springs that exert high spring forces can cause the feeder to be lifted from the platen and moved toward its FIG. 3 position merely by unlatching the feeder.

The invention has been described in detail with particular reference to a preferred embodiment thereof, but it will be understood that variations and modifications can be effected within the spirit and scope of the invention as described hereinabove and as described in the apended claims.

We claim:

1. In apparatus for mounting a document feeder on a copier/duplicator or the like for movement between a first position adjacent an exposure station of the copier/duplicator and a second position spaced from the exposure station, the improvement comprising:

means pivotally mounting the feeder on the copier/duplicator (1) for movement about a first axis during initial movement of the feeder away from the exposure station and (2) for movement about a second axis during subsequent movement of the feeder away from the exposure station, the first and second axes being offset from the exposure station with the second axis being further from the exposure station than the first axis, and stop means associated with the mounting means for stopping movement of the feeder about the first axis after the feeder has moved through a first lift angle; and counter-balance means coupled to the feeder to facilitate movement of the feeder between its first and second positions.

2. The invention as set forth in claim 1 wherein the means pivotally mounting the feeder on the copier/duplicator comprises at least one bracket, means pivotally connecting the bracket to the feeder so that the feeder can move relative to the bracket about the first axis, and means pivotally connecting the bracket to the copier/duplicator so that the feeder and the bracket can move relative to the copier/duplicator about the second axis.

3. The invention as set forth in claim 2 wherein the stop means comprises stop members on the feeder and on the bracket, the stop members being spaced from each other when the feeder is in its first position and the stop members being engageable after the feeder has moved about the first axis through the first lift angle, thereby to cause the feeder and the bracket to move together as the feeder moves through a second lift angle to its second position.

4. The invention as set forth in claim 1 further comprising first counter-balancing means for balancing the feeder as it moves from its first position to its second position, and second counter-balancing means for balancing the feeder as it moves about the second axis.

5. The invention as set forth in claim 4 wherein the second counter-balancing means comprises (1) means for applying a positive force urging the feeder toward its second position during a portion of its movement about the second axis and (2) means for applying a negative force resisting movement of the feeder toward its second position during another portion of its movement about the second axis.

6. In apparatus for mounting a document feeder on a copier/duplicator or the like for movement between a first position wherein the feeder is generally horizontally disposed over an exposure station of the copier/duplicator and a second position wherein the feeder is generally vertically disposed and spaced from the exposure station, the improvement comprising:

a pair of brackets for mounting the feeder on the copier/duplicator, each of the brackets having a pivotal connection to the feeder so that the feeder can move relative to the brackets about a first axis through a first lift angle, and each of the brackets having a pivotal connection to the copier/duplicator so that the brackets and the feeder can move relative to the copier/duplicator about a second axis through a second lift angle, the first and second axes being spaced from each other;

stop means supported by at least one bracket and positioned to block further movement of the feeder about the first axis after the feeder has moved from its first position toward its second position through the first lift angle so that further movement of the feeder toward its second position is about the second axis; and counter-balance means coupled to the feeder to facilitate movement of the feeder between its first and second positions.

7. The invention as set forth in claim 6 wherein the copier/duplicator has a back, a front, and a side, and the brackets are located relative to the feeder and the side of the copier/duplicator so that the first and second axes extend in a front to rear direction adjacent the side of the copier/duplicator.

8. The invention as set forth in claim 6 wherein the first and second axes are spaced from each other and from the exposure station with the second axis being further from the exposure station than the first axis, and the counter-balance means comprises first spring means urging the feeder toward its second position from its first position during movement through the first lift angle, and the counter-balance means further comprises second spring means urging the feeder toward its second position during a first portion of the movement of the feeder through its second lift angle and urging the feeder in the opposite direction during a second portion of the movement of the feeder through its second lift angle.

9. The invention as set forth in claim 6 wherein the counter-balance means comprises first spring means urging the feeder toward its second position from its first position, and the counter-balance means further comprises a cylinder pivoted to the copier/duplicator, a piston movable in the cylinder, a rod secured to the piston and to one of the brackets so that the rod and piston are moved in response to movement of the bracket, and second and third spring means positioned inside the cylinder, the second spring means being compressed between the piston and one end of the cylinder when the feeder is in its first position so that the second spring means is effective to urge the bracket and the feeder about the second axis during initial movement of the feeder through its second pivot angle, and the third spring means being located between the piston and another end of the cylinder so that the third spring means is compressed during movement of the feeder through its second lift angle as it approaches the second position, whereby the third spring means retards movement of the feeder toward its second position during the last portion of the movement of the feeder through the second lift angle.

10. The invention as set forth in claim 6 wherein the counterbalance means comprises a plurality of members for applying (1) a first positive force for urging the feeder toward its second position as the feeder moves through its first lift angle, (2) a second positive force for urging the feeder toward its second position as the feeder moves through a first part of its second lift angle, and (3) a negative force opposing movement of the feeder to its second position as the feeder moves through a second part of its second lift angle.

11. The invention as set forth in claim 6 wherein the first and second axes are spaced from each other and from the exposure station, the second axis being at a level below the first axis, and the second axis being further from the exposure station than the first axis so that the feeder can be stepped away from the exposure station by pivoting the feeder first about the first axis and then about the second axis, thereby providing a relatively large open area between the exposure station and the feeder to accomodate a portion of a book or the like when another portion of the book is registered at the exposure station for copying.

* * * * *